Patented Aug. 23, 1938

2,127,841

UNITED STATES PATENT OFFICE 2,127,841

CONDENSATION PRODUCTS OF HIGH MOLECULAR ALBUMINOUS SPLIT PRODUCTS

Walter Gellendien, Berlin-Charlottenburg, Germany, assignor to Deutsche Hydrierwerke Aktiengesellschaft, Berlin-Charlottenburg, Germany, a corporation of Germany No Drawing. Application January 15, 1935, Serial No. 1,900. In Germany January 16, 1934

7 Claims. (Cl. 260—121)

This invention relates to compounds having wetting and cleansing properties rendering them excellently adapted for use in the treatment of textile materials.

In accordance with a process already known to the art, "albuminous split products" are condensed with higher molecular fatty acids or higher molecular organic sulfonic acids, or with their derivatives, to produce products suitable for use principally in the finishing of various fibrous materials. Such process is disclosed in the Sommer Patent No. 2,015,912 wherein there is disclosed "treating high molecular split off products of albumin particularly those of the lysalbinic acid and protalbinic acid type, with higher saturated or unsaturated fatty acid chlorides".

The object of the present invention is to produce products which are in some respects similar to those of the said patent but which possess superior properties as will hereinafter be described.

In accordance with the present invention, condensation products having unusually effective properties are obtained from the higher molecular split products of the nature of those described in the above mentioned patent by condensing such products under alkaline conditions in conventional manner with certain compounds containing at least one higher molecular aliphatic group in the molecule, a halogen atom in a readily reactive condition and at least one other modifying radical as will hereinafter be disclosed.

According to one embodiment of the present invention, the compounds used possess the general formula:

Halogen—C(R₁R₂)—CO—X wherein X stands for a —OR₃ group or a —N(R₃R₄) group and at least one of the groups R₁ to R₄ stands for a higher molecular aliphatic group and the remaining three groups stand for hydrogen or a hydrocarbon group.

Such compounds are e. g. the esters and the amides of α-halogen fatty acids wherein it is essential that in the molecule—either in the acid component or in the alcohol component or in the amido-group—there be a higher molecular aliphatic alkyl-residue. As components for the reaction with the albuminous products there may be considered e. g. chloro acetic-acid lauryl-ester, α-bromo propionic-acid-cetyl-ester, α-bromo-lauric acid-oleyl-ester, di-chloro carbonic acid-ester of 1,18-stearylene-glycol, chloro acetic acid-N-laurylamide, chlor-acetic acid-(N-cetyl-phenyl)-amide, α-bromo-lauric acid-oleyl-amide, dilauryl-carbamide-chloride and others.

Among the albuminous split-products adapted to form the valuable high molecular fatlike products capable of being condensed with the said organic compounds which in the alkyl-residue may also contain any substituents such as halogen, hydroxyl, free or substituted amino-groups, there are the di- and polypeptides to be mentioned such as e. g. the leucyl-leucine, silk-fibroine and others, derivates of albumin such as lysalbinic acid, separation-products of size, casein, gelatine, leather, horn etc., which products may be described collectively as the water soluble higher molecular products of simple hydrolysis of albuminous materials containing amino groups with a replaceable hydrogen atom. As to the condensation one proceeds in the following way: The albuminous split-products are dissolved or emulsified in slightly alkaline aqueous media, whereupon one adds the halogen compound under vigorous stirring, taking care that a slightly alkaline reaction is always prevailing. The reaction temperatures may be between —20 and +150° but generally the reaction takes place at 5–35°, whereby it is sometimes advantageous to let the temperature subsequently rise to about 70–80°. The reaction takes place by the union of the amino group of the albuminous derivative with the halogenated atom of the molecule containing the higher molecular alkyl group, thereby liberating halogen halide.

Furthermore the organic carbonic acid halogenides of the general formula halogen-CO-R⁵-Y-R⁶ are likewise suitable as condensable compounds for the condensation with higher molecular albuminous split-products. In the said formula, R⁵ means an alkylene- or arylene residue and R⁶ any hydrocarbon residue, with the understanding that one of same contains no less than 8 C-atoms in an aliphatic chain. The hydrocarbon residues may furthermore contain some substituents such as halogen, amino, hydroxyl. The symbol Y stands for the elements O or S respectively or the atom-groups SO₂, NR⁷, CONR⁷, NR⁷CO or NR⁷SO₂, wherein R⁷ means hydrogen or any hydrocarbon residue. Such compounds are e. g. the ethers and thio-ethers of carbonic acid halogenides, alkyl-sulfo-carbonic-acid halogenides, alkyl-amino-carbonic-acid halogenides, substituted carbon-amide-carbonic-acid halogenides, acidyl-amino-carbonic-acid halogenides and N-alkylsulfamide-carbonic-acid halogenides, wherein it is, however, necessary that at least one higher molecular aliphatic hydrocarbon residue with no less than 8 C-atoms is always present in the total molecule. As components for the condensation with albuminous split-products such as di- and poly-peptides, albumin derivatives, separation-products of size, casein, horn, leather etc. may be considered e. g. ω-butyl- or cyclo-hexyl-ether of capric acid-chloride, lauroxy-acetic-acid bromide, ω-piperidino undecylene-acid chloride, N-lauryl-phenylamino-acetic-acid-chloride, α-phenyl-thio-laurin acid bromide, β-cetyl-thio-propionic acid chloride, dodecyl-sulfo-acetic acid chloride, N-diocetyl-adipic acid-amide-acid chloride, N-lauroyl-phenyl-amino-acetic acid chloride, N,N-dodecyl-p-toluol-sulfonyl-amino-acetic acid chloride and others.

The condensation of these compounds with the albuminous split-products is done in the usual way in alkaline media and under the same conditions as described above.

Example 1

130 weight-parts of technical lysalbinic acid sodium salt are dissolved in 150–200 parts of water. Thereupon one adds gradually, under stirring, 80 parts by weight of chlor-acetic acid-N-dilaurylamide. At the same time one adds 20 parts by weight of a 33% solution of caustic soda. The reaction temperature is kept for some hours at 25–30°, whereupon one heats the mass to 60–70° for a short period. The reaction product can be worked in the well-known manner, by evaporating in vacuo, to form a paste ready for use or a dry powder.

By adding the thus obtained reaction product at the rate of 2 g. per litre to an aqueous washing bath or to an alkaline textile treatment bath, one secures an excellent cleansing or wetting effect or an equalizing effect, respectively.

It is also remarkable that the aforedescribed products impart to the thus treated textile-materials an enhanced protection against deterioration.

Example 2

By adding to a dyeing-bath 1–2 g. per litre of a condensation product obtainable through the combination of 39 parts by weight of lysalbinic acid sodium salt dissolved in 10-times its weight of water with 26 parts by weight of N-lauroyl-phenylamino-acetic acid-chloride with an addition, at 30–40° C., of 6 parts by weight of a 33% solution of caustic soda, one secures a uniform distribution of color in the material.

Example 3

In condensing the di-sodium salt of thio-glycolic acid with dodecyl-chloride in the well-known manner and in thereafter oxydizing the sulfide obtained by means of an aqueous nitric acid solution, there results the dodecyl-sulfo-acetic acid, which after converting into the acid chloride permits an easily effected condensation, according to the well-known method, with split-products of casein or gelatine leading to the formation of high molecular products. The latter are gained either in the form of concentrated aqueous solutions or of condensed pastes or of easily soluble light yellow to light brown powders.

By an addition of 0,3% of this condensation product to a washing-bath one obtains with textile materials an excellent wetting and cleansing effect.

Of a similar effect is e. g. also a condensation product obtainable from the ω-butyl-ether of capric acid bromide and lysalbinic acid sodium salt. It is remarkable that to materials treated with the aforedescribed condensation products an enhanced protection is imparted against chemical and mechanical influences.

What I claim is:—

1. Textile treating agents consisting of the alkaline condensation products of water soluble higher molecular products of simple hydrolysis of albuminous materials containing amino groups with a replaceable hydrogen atom, with a compound selected from the group consisting of the compounds of the general formula

Halogen—C($R_1R_2$)—CO—X wherein X stands for a —$OR_3$ group or a —$N(R_3R_4)$ group, at least one of the $R_1$, $R_2$, $R_3$ and $R_4$ groups stands for a higher molecular aliphatic group, the remaining three R's being hydrogen or a hydrocarbon group, and compounds of the general formula

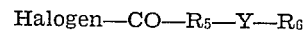

Halogen—CO—$R_5$—Y—$R_6$ wherein $R_5$ stands for a hydrocarbon group and $R_6$ stands for a hydrocarbon group and at least one of the two groups contains no less than 8 carbon atoms in an aliphatic hydrocarbon chain, and wherein Y stands for one of the atoms or atom groups O, S, $SO_2$, $NR_7$, $CONR_7$, $NR_7CO$ or $NR_7SO_2$, wherein $R_7$ stands for hydrogen or a hydrocarbon group.

2. New compounds consisting of the alkaline condensation products of water soluble higher molecular products of simple hydrolysis of albuminous materials containing amino groups with a replaceable hydrogen atom, with compounds of the general formula Halogen—C($R_1R_2$)—CO—X wherein X stands for a member of the group consisting of a —$OR_3$ group and a —$N(R_3R_4)$ group, at least one of the $R_1$, $R_2$, $R_3$ and $R_4$ groups standing for a higher molecular aliphatic group, the remaining three R's being selected from hydrogen and hydrocarbon groups.

3. Textile treating agents having wetting and cleansing properties which consist in the alkaline condensation products of water soluble higher molecular products of simple hydrolysis of albuminous materials containing amino groups with a replaceable hydrogen atom, with compounds of the general formula

Halogen—CO—$R_5$—Y—$R_6$ wherein $R_5$ stands for a hydrocarbon group and $R_6$ stands for a hydrocarbon group and at least one of the two groups contains no less than 8 carbon atoms in an aliphatic hydrocarbon chain, and wherein Y stands for one of the atoms or atom groups O, S, $SO_2$, $NR_7$, $CONR_7$, $NR_7CO$ or $NR_7SO_2$, wherein $R_7$ stands for hydrogen or a hydrocarbon group.

4. The textile treating agent consisting of the alkaline condensation product of the sodium salt of lysalbinic acid with chlor-acetic acid-N-di-lauryl-amide.

5. Textile treating agents which consist in the alkaline condensation products of water soluble higher molecular products of simple hydrolysis of albuminous materials containing amino groups with a replaceable hydrogen atom, with compounds of the general formula

Halogen—CO—N($R_3R_4$)

wherein at least one of the groups $R_3$ and $R_4$ is a higher aliphatic group while the remaining group comprises a member of the group consisting of hydrogen and hydrocarbon groups.

6. The composition for use in the treating of textile materials of the general formula Z—C($R^1R^2$)—CO—X, wherein Z represents a radical of a water soluble higher molecular protein group obtained by simple hydrolysis of an albuminous compound containing at least one amino group and X represents a member of the group consisting of —$OR^3$ and —$NR^3R^4$, and wherein at least one of the $R^1$, $R^2$, $R^3$ and $R^4$ groups stands for a higher molecular aliphatic group, the remaining three R's being selected from hydrogen and hydrocarbon groups.

7. The composition for use in the treating of textile materials of the general formula Z—CO—Y, wherein Z represents a radical of a water soluble higher molecular protein group obtained by simple hydrolysis of an albuminous compound containing at least one amino group and Y represents $NR^3R^4$, wherein $R^3$ is a higher molecular aliphatic group and $R^4$ is hydrogen.

WALTER GELLENDIEN.